US006438819B1

United States Patent

McGlinchy et al.

(10) Patent No.: US 6,438,819 B1
(45) Date of Patent: Aug. 27, 2002

(54) SYSTEM FOR FABRICATING CONTOUR MUNTIN BARS FROM SHEET MATERIAL

(75) Inventors: Timothy B. McGlinchy, Twinsburg; Mohamed Chrif Khalfoun, Cleveland Heights; John Louis Grismer, Cuyahoga Falls, all of OH (US)

(73) Assignee: Glass Equipment Development, Inc., Twinsburg, OH (US)

( * ) Notice: Subject to any disclaimer, the term of this patent is extended or adjusted under 35 U.S.C. 154(b) by 0 days.

(21) Appl. No.: 09/525,349

(22) Filed: Mar. 15, 2000

Related U.S. Application Data

(63) Continuation-in-part of application No. 08/797,031, filed on Feb. 7, 1997, now Pat. No. 6,173,484.
(60) Provisional application No. 60/138,225, filed on Jun. 9, 1999.

(51) Int. Cl.$^{7}$ .......................... B23Q 15/00; B23P 23/00

(52) U.S. Cl. .......................... 29/564.6; 29/417; 29/414; 29/564.7; 29/564.8; 72/181

(58) Field of Search .............................. 52/204.61, 664, 52/667, 668; 29/417, 469.5, 897.35, 700, 414, 791, 792, 799, 709, 711, 897, 897.3, 897.31, 897.34, 412, 714; 72/181, 178

(56) References Cited

U.S. PATENT DOCUMENTS

| | | | | | |
|---|---|---|---|---|---|
| 2,959,749 | A | * | 11/1960 | Rubin | 29/417 |
| 4,975,334 | A | * | 12/1990 | Bullivant-Clark | 428/593 |
| 5,058,269 | A | * | 10/1991 | May | 29/897.35 |
| 5,088,307 | A | * | 2/1992 | Cole | 72/46 |
| 5,179,770 | A | * | 1/1993 | Block et al. | 29/17.3 |
| 5,295,292 | A | * | 3/1994 | Leopold | 29/417 |
| 5,361,476 | A | * | 11/1994 | Leopold | 29/417 |

* cited by examiner

*Primary Examiner*—David P. Bryant
(74) *Attorney, Agent, or Firm*—Watts, Hoffmann, Fisher & Heinkeo Co., L.P.A.

(57) ABSTRACT

Apparatus for making a contoured muntin bar. A supply of sheet material having a finished surface on at least one side in the form of a coiled ribbon is unwound and fed along a strip path of travel to a punch station. At the punch station a ribbon punching mechanism punches the ribbon at a precisely predetermined locations along the ribbon to form one of a plurality notch patterns that define a portion of a contoured muntin bar. Downstream along the travel path from the punch station the ribbon is fed through a forming station having a succession of forming rolls that define a succession of forming roll nips to bend the ribbon and form a generally closed cross-sectional tube. The rolls form a number of bending stages to produce a muntin bar tube having a contoured shape with raised sides to provide an attractive appearance to a muntin grid.

13 Claims, 14 Drawing Sheets

SYSTEM FOR FABRICATING CONTOUR MUNTIN BARS FROM SHEET MATERIAL

CROSS REFERENCE TO RELATED APPLICATIONS

The present application is a continuation in part of U.S. patent application Ser. No. 08/797,031 entitled "System for Fabricating Muntin Bars from Sheet Material" filed Feb. 7, 1997 now U.S. Pat. No. 6,173,484, which claims benefit of provisional application No. 60,138,225 filed Jun. 9, 1999.

FIELD OF THE INVENTION

The present invention relates to the fabrication of insulating glass units for windows, and more particularly to a system for fabricating muntin bars used in the construction of insulating glass units.

BACKGROUND ART

Windows constructed from multiple glass panes utilized "muntins" or "muntin bars" to secure the edges of the individual glass panes within the window sash. In many windows, muntins formed distinctive grid patterns that are associated with architectural styles of buildings containing the windows.

Modern windows formed by insulating glass units utilize single glass lights separated by an insulating dead air space. Where a particular architectural "look" is desired, a grid of muntin bars is fixed in the dead air space between the glass lights to simulate a multipane window. Typical muntin bars for insulating glass units are formed from decoratively coated interfitted metal tubes. The grids are anchored to the insulating glass unit periphery.

Constructing muntin bar grids for insulating glass units has been a labor intensive process. As a consequence, manufacturing such units, and thus windows formed by the units, has been costly and inefficient. Some efforts to mechanize the manufacture of muntin grids have been made. For example, machines for notching lengths of preformed tubular muntin bar stock at predetermined locations have been proposed. The muntin bar stock is cut into lengths for use in forming a grid for a given size insulating glass unit. The cut muntin bar stock is then fed into the notching machine and notches are formed at predetermined locations along each length. The grids are assembled by hand by interfitting the respective muntin bars at the notches.

The muntin bar stock is produced by roll forming decoratively coated sheet material such as aluminum or steel, in a known manner. Various sizes of the sheet material are used to form different size muntin bar stock. The roll forming machine has a series of rolls configured to form sheet material into elongated tubular muntin bar stock. A window manufacturer purchases the muntin bar stock size(s) needed to produce insulating glass units and, as described above, cuts the stock into lengths that are notched and assembled into grids for incorporation into the insulating glass units.

Conventional muntin bar constructions suffer from several drawbacks with respect to cost and efficiency. For example, insulating glass unit manufacturers are required to purchase and maintain an inventory of tubular muntin bar stock. In some instances, several different muntin bar stock sizes and colors are inventoried to produce grids for various insulating glass units. This necessitates dedicated muntin bar stock storage space and increases costs associated with inventory. In addition, the muntin bar stock must be cut into lengths the size of which depends on the size of the insulating glass units being manufactured. While dedicated machinery may be used to cut the stock, a machine operator is still required to perform at least some hand measurements in order to produce correctly cut-to-length muntin bars. Moreover, cutting the muntin bar stock frequently results in unusable scrap.

The cut-to-length muntin bars are then fed to a notching device to form notches that will be located at the muntin bar intersections. Although some machinery may be specialized to notch the bars for forming grids, the muntin bars typically must be manually handled to produce correctly sized muntin bars with properly located notches. As a result, conventional construction of muntin bars and muntin bar grids requires the operator to perform a series of fabricating steps, thereby increasing the difficulty and cost associated with such construction. The handling and notching procedures may also result in damage to the muntin bar finish and denting, or creasing.

The present invention provides a new and improved system for fabricating muntin bars which is so constructed and arranged that muntin bars are quickly and efficiently formed from sheet material, notched or otherwise formed to permit subsequent attachment in a grid, and then cut to length without requiring significant handling or mentation on the part of the individual fabricating the muntin bars. The invention provides a method and apparatus for continuously producing notched muntin bars from sheet stock; thus, a manufacturer is able to store coils of sheet material rather than a supply of precut tubular muntin stock. Also, production of the muntin bars is automatically controlled to allow muntin bars to be custom formed for specific orders.

SUMMARY OF THE INVENTION

The present invention concerns method and apparatus for making a contoured muntin bar. A strip of sheet material having a finished surface on at least one side is unwound from a supply and fed along a strip travel path to a punch station. At the punch station a ribbon punching mechanism punches the ribbon at a precisely predetermined locations along the ribbon to form one of a plurality notch patterns that define a portion of a contoured muntin bar.

Downstream from the punch station the ribbon is fed through a forming station having a succession of forming rolls that bend the ribbon and form a generally closed cross-sectional tube. The rolls bend the strip in stages to produce a muntin bar tube having a contoured shape with raised sides that provide an attractive appearance to the muntin grid made from the contoured muntin bars.

The closed cross-section tube is routed from the forming station to a cutting station. At the cutting station an endmost muntin bar is cut from the tube at a precisely predetermined location by cutting the tube along a cut line that is defined by the notch patterns. Sensors monitor the progress of the fabrication of muntin bars and communicate the sensed status to a programmable controller which co-ordinates all processing steps.

A second of the notch patterns creates a mitred end to the muntin bars. In response to sensing a notch pattern for forming a mitred bar end, the controller initiates the clamping an end of the muntin tube prior to severing an endmost muntin bar. After the severing step, the severed muntin bar is moved away from the muntin tube to which it was previously attached to widen a gap between the severed muntin bar and the muntin tube. The mitred ends of the severed muntin bar and the muntin bar tube that are spaced apart by the gap are then finished by moving a high speed router bit specially configured to shape the ends through this widened gap.

After an endmost bar is severed the process has produced a tubular muntin bar made up of an elongated tube having two mitred ends, two flat ends or one mitered end and one flat end. The mitred ends include muntin bar portions that fit over mid portions of other muntin bars to form a part of a grid. The flat ends form outer bounds of a completed muntin bar grid for contacting a window spacer frame.

The cross section of a completed muntin bar defines a perimeter that encloses an area having the general shape of a cross. The cross-shaped area defined by the perimeter of the formed muntin bar has two relatively narrow top and bottom legs and two relatively wide side legs. The length of the top and bottom legs is the same and the length of the two side legs is the same. The width of each leg tapers down along its length. A seam is formed at the end of one of the legs where two edges of the material used to form the tube meet. No welding of the seam is required after severing of the muntin bar. The severed bar can immediately be assembled into an attractive ready to install muntin bar grid.

Practice of the invention results in faster production of contoured muntin bars when compared to prior art production speeds. Using the apparatus and method of the disclosed invention, one person can make and assemble 1000 grid units during an eight hour shift compared to approximately 200 units when using fabrication techniques of the prior art. The cost per foot of muntin bar produced is also lower. The cost in making the contoured muntin bars using the invention is less than half the cost of making them with prior art apparatuses and the quality is better. More specifically, the invention produces higher quality, virtually seamless bars with precision cuts where the bar engages the window spacer frame and miters the muntin bars where they engage cross bars of the grid. The invention facilitates "just in time" manufacturing since the bars that make up a grid can be programmed into a controller and produced by the operator as other grids are being made. The controller optimizes the use of materials. The controller makes muntin bars for each grid in turn and then begins producing muntin bars for a subsequent grid based on a program of jobs programmed by the user. Excess payout of strip material is avoided and practice of the invention has reduced scrap material by at least 10 percent.

These and other objects, advantages and features of the invention will become better understood from the detailed description of a preferred embodiment of the invention which is described in greater detail in conjunction with the accompanying drawings.

BRIEF DESCRIPTION OF THE DRAWINGS

Other features and advantages of the invention will become apparent from the following detailed description of preferred embodiments thereof taken in conjunction with the accompanying drawings, wherein.

DETAILED DESCRIPTION OF PREFERRED EMBODIMENTS

Figure 1:
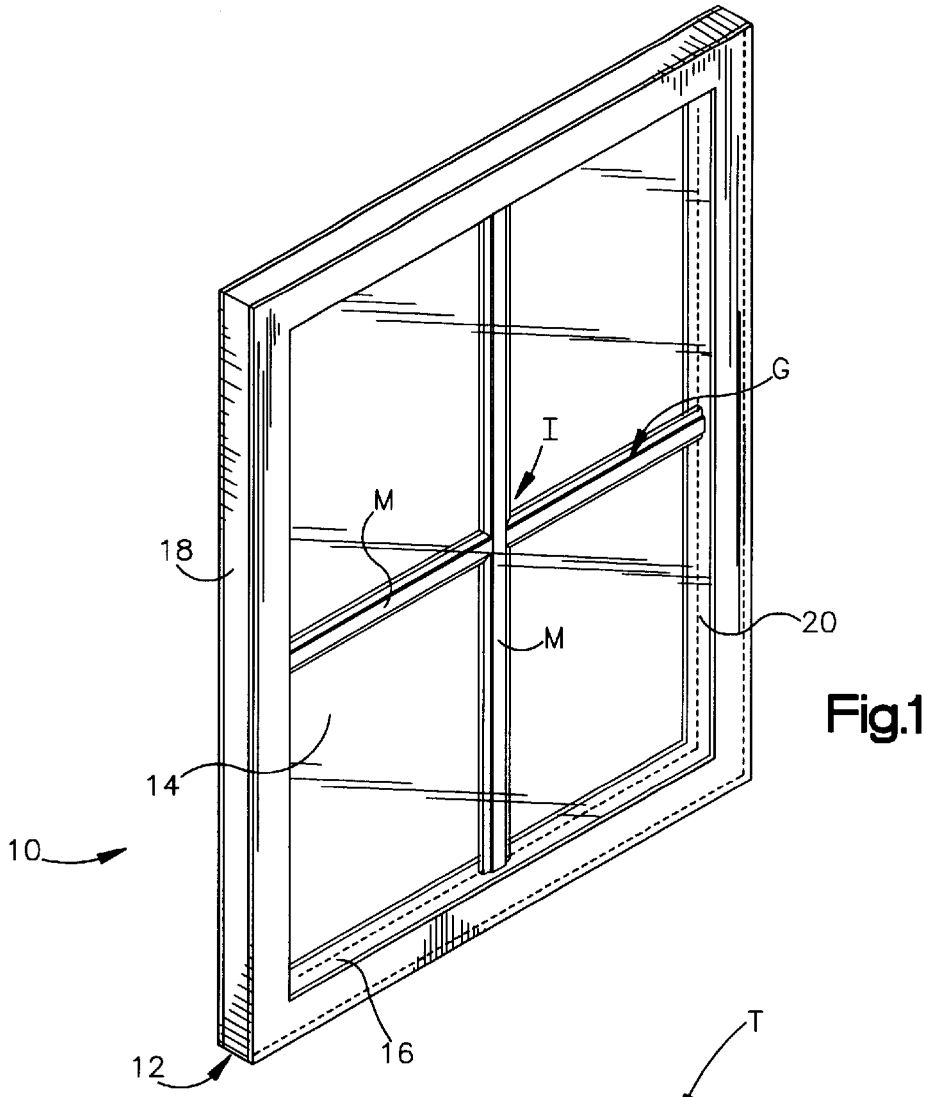
FIG. 1 is a perspective view of an insulating glass unit including a muntin bar grid constructed in accordance with the invention.

FIG. 1 shows an insulating glass unit indicated generally by the reference numeral 10 comprising a spacer assembly 12 sandwiched between glass sheets, or lights, 14. The spacer assembly 12 includes a frame assembly 16 hermetically joined to the glass lights by a sealant 18 to form a closed dead air space 20 between the lights. The unit 10 is illustrated in FIG. 1 in condition for assembly into a window or door frame (not shown).

A muntin bar grid G is disposed between the glass lights to provide the unit 10 with the appearance of a multi-pane window. Depending on the size of the glass sheet mounted in the spacer assembly the grid G can subdivide the glass sheet into different number of segments or panes. The light illustrated in FIG. 1 has been divided into four different panes, but many other configurations of muntin bar grids for dividing the lights into other numbers of panes is possible.

Figure 2A:
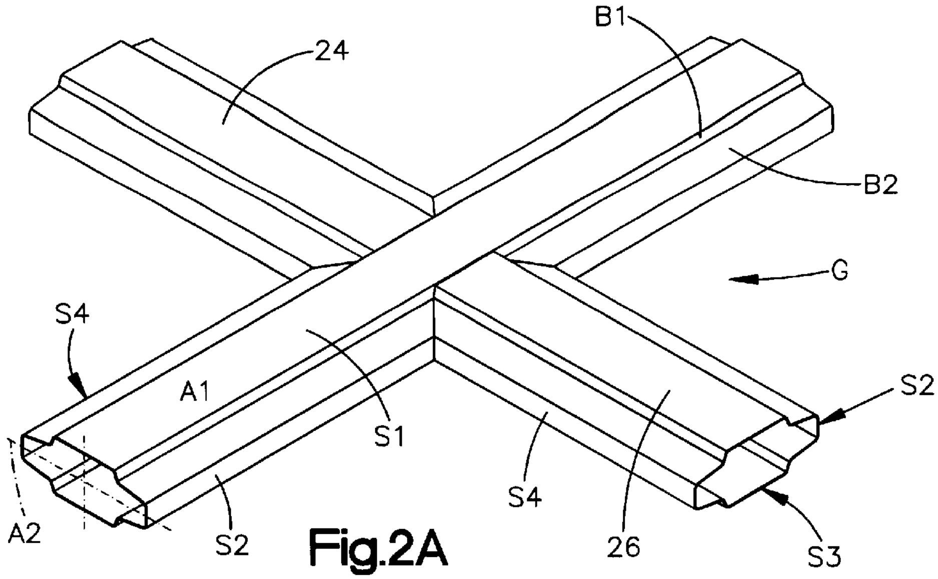
FIG. 2A is an enlarged perspective view of an intersecting portion of the muntin bar grid of the insulating glass unit of FIG. 1.
Figure 2B:
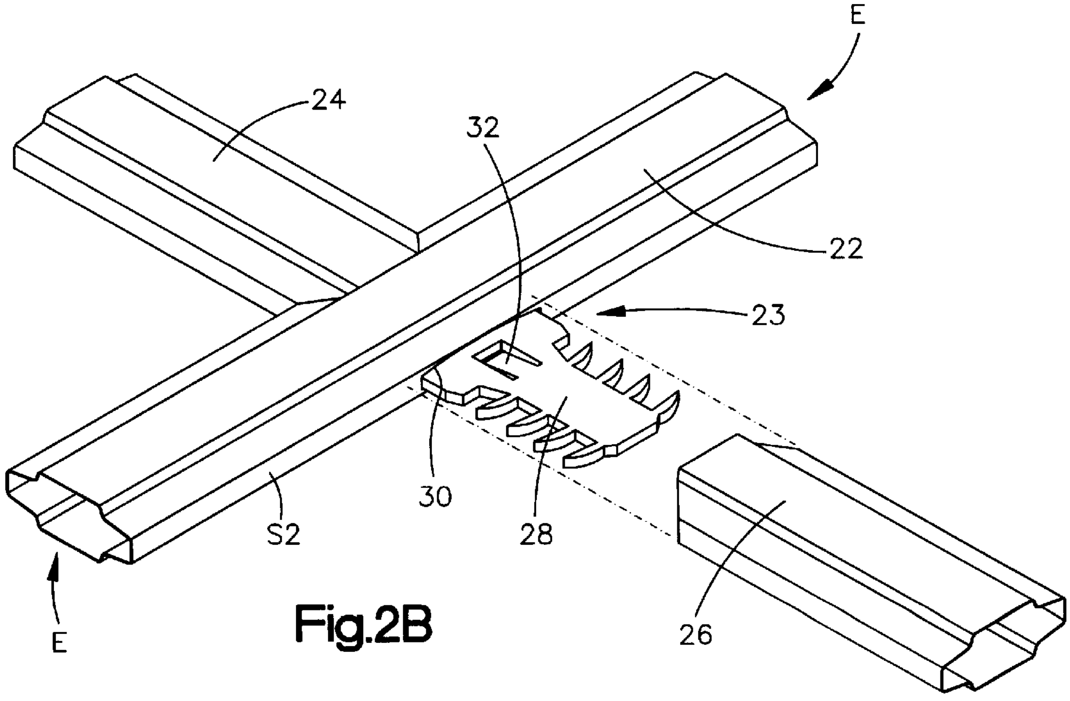
FIG. 2B is an enlarged perspective view of the intersecting portion shown in FIG. 2A with one bar disengaged from a transversely extending bar to show an interconnecting clip.
Figure 8:
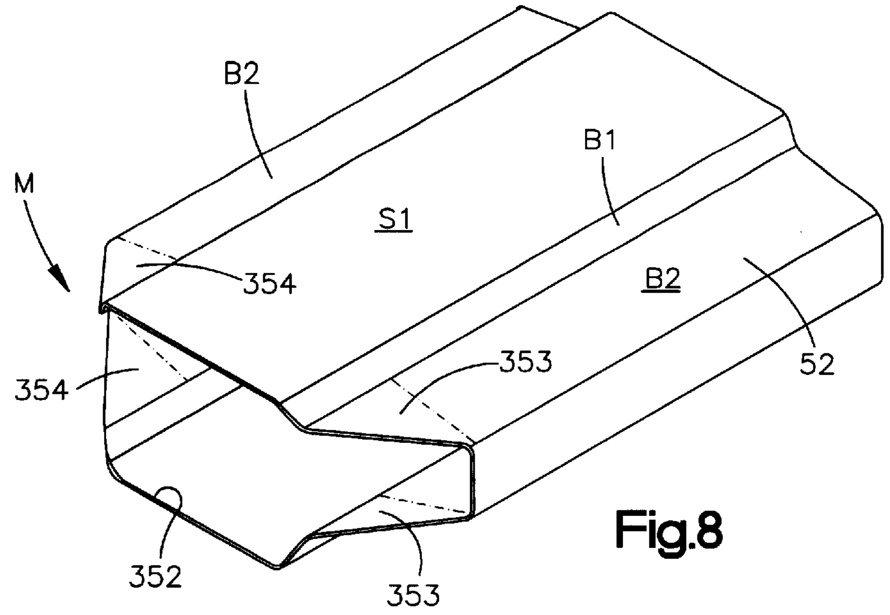
FIG. 8 is a perspective view of a muntin bar having a mitred end.

The muntin bars depicted in FIGS. 1, 2A, and 2B are contoured muntin bars. Such a muntin bar presents a more appealing appearance than the rectangular cross section muntin bar disclosed in parent application Ser. No. 08/797,031. As seen in the views of FIGS. 2A and 2B an interior region of the bars is hollow and the sheet material used to construct the muntin bar is bent as described below to be symmetric on opposed sides of transverse axes A1, A2 that intersect four generally flat surfaces S1 and S4. The two surfaces designated S1, S3 in FIG. 2A are side surfaces and the two surfaces designated S2, S4 are top and bottom surfaces. Interconnecting the planar surfaces S1, S2 are two beveled surfaces B1, B2.

FIG. 2A illustrates a grid G for dividing the light into four panes. As seen in FIG. 2B a first elongated muntin bar 22 extends across a width of the window. Attached to a middle region 23 of the bar 22 are two shorter transversely extending bars 24, 26. The two shorter bars 24, 26 are connected to the elongated muntin bar 22 by means of a muntin clip 26 (preferably constructed from plastic) that extends through the middle region 23 of the bar 22. When the clip is attached to the muntin bar 22, it extends beyond the two sides S2, S4 of the bar 22 so that the two transverse muntin bars 24, 26 can be attached to the clip. During fabrication of the grid G from its constituent muntin bars 22, 24, 26 one end of the clip 28 is inserted into one of two elongated side slots 30 in the bar 22 and is pushed through the elongated bar 22 so that the end of the clip first inserted into the bar 22 exits a similar slot 30 formed in an opposite side surface S2 of the bar 22. For the clip to extend through the slots 30 a flexible tab 32 that normally extends downwardly (as seen in FIG. 2B) is flexed away from its normal configuration so that the clip 28 can be pushed through the muntin bar 22. When the clip has been pushed through the bar the tab 32 snaps back to its unflexed position and overlies the surface S2 to prevent the clip from sliding back into the bar 22. Additional details of the clip 28 are disclosed in co-pending U.S. patent application Ser. No. 09/233,834 filed Jan. 20, 1999 entitled "Muntin Grid Joiner" which is assigned to the assignee of the present invention and which is incorporated herein by reference.

Flat ends F of the muntin bars that make up the grid G are secured to the interior of the spacer frame assembly 16 by suitable fasteners as are known in the art. Opposite ends of the muntin bar 22 are cut by a saw as described below to present a planar end E that uniformly abuts a generally flat surface of the spacer frame assembly 16. While both ends of the bar 22 are uniformly cut to define generally planar abutting ends, the two shorter transverse muntin bars 24, 26 each have one flat end E for abutting a spacer frame and an inwardly facing mitred end that overlies the center section 23 of the bar 22 in the region of the slot 30.

Figure 3:
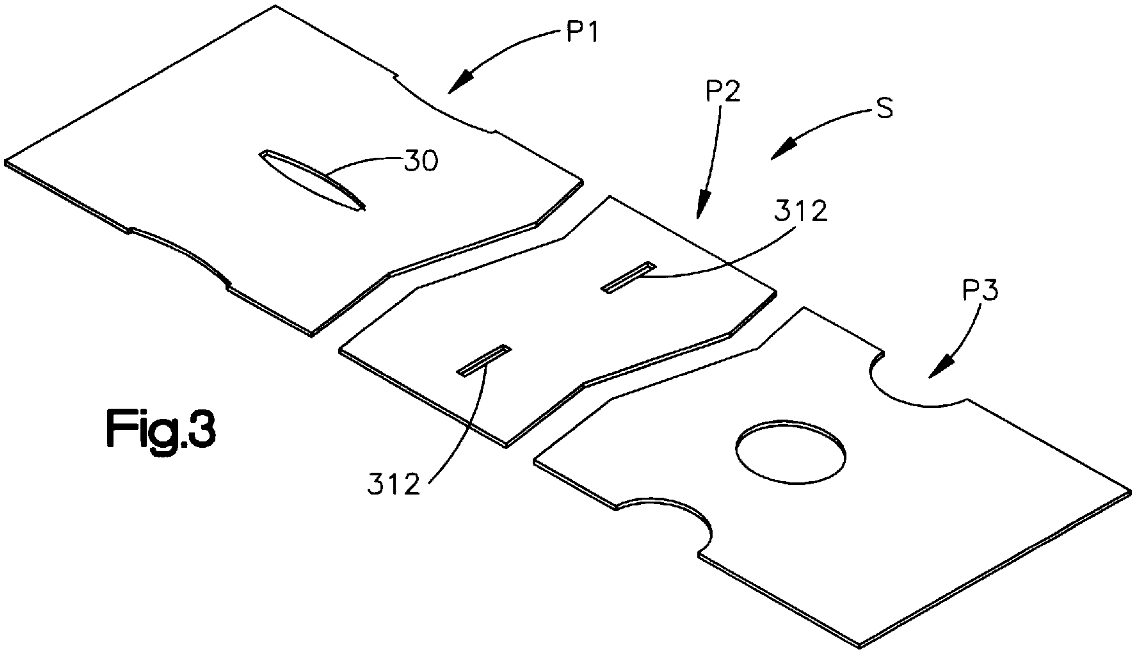
FIG. 3 is a perspective view of a portion of sheet or stock material partially processed according to the invention.

FIG. 3 shows a length of stock material S that is to be formed into a muntin bar according to the invention. One side of the stock material S may be coated or otherwise treated to include a decorative color or pattern. The stock material S is in the form of thin ribbon stock material and may comprise, for example, aluminum or steel. According to the invention, the ribbon stock material S is fed lengthwise through a muntin bar production line 100 including a series of forming stations and is formed into a muntin bar such as those depicted in FIGS. 2A and 2B.

Figure 4:
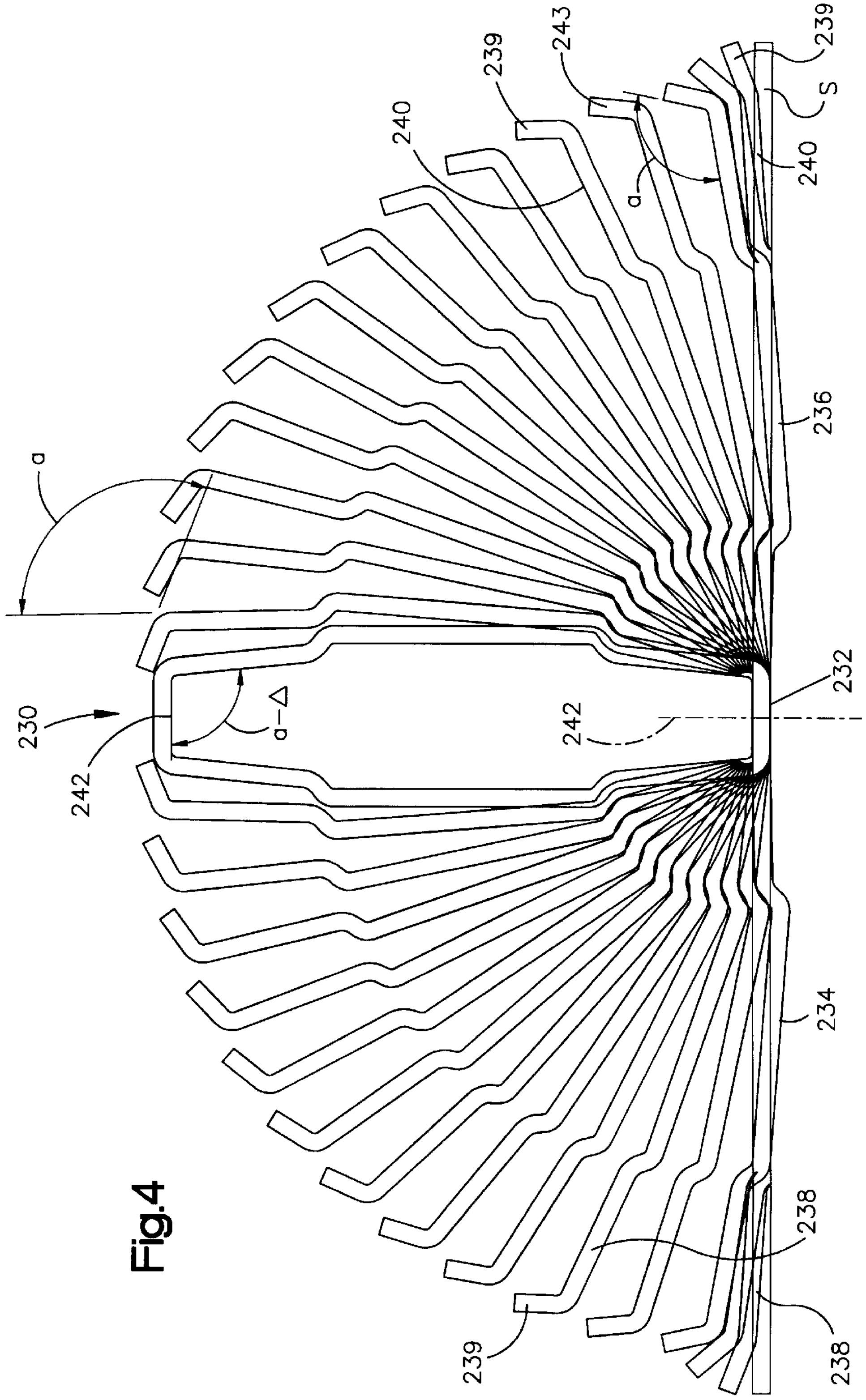
FIG. 4 is an elevation view schematically illustrating different roll stages during roll forming of the stock material of FIG. 3 into a contoured tubular muntin bar.

A first forming station (described in more detail below) forms one of three different notch patterns P1 & P3 at precise locations along the length of the stock material S. The choice of the particular notch pattern depends on the type of muntin bar being formed. Downstream from the first forming station, a second forming station bends the notched sheet material into a tubular muntin bar. FIG. 4 schematically illustrates the preferred manner in which the stock material S is formed into a contour muntin bar. The stock material S is folded from its flat configuration in a series of steps to form a muntin bar having a desired contoured cross-sectional configuration. The finished configuration of the illustrated tubular muntin bar comprises a tubular member closed about its periphery. A third forming station severs the tubular muntin bar at a desired predetermined location. To form properly finished mitred ends on muntin bars that engage the sides of other muntin bars, the third forming station also finishes the mitred end (or ends) of the bar so that the bar can overlap the side portion of a transversely extending bar such as the muntin bar 22 in FIGS. 2A and 2B.

Figure 5B:
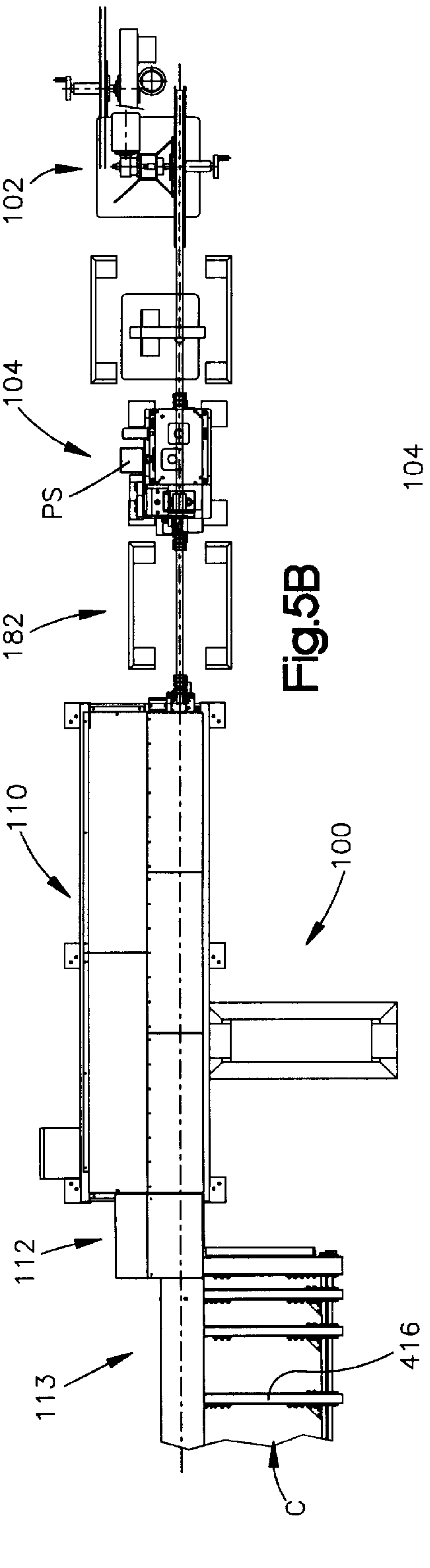
FIG. 5B is a plan view of the muntin bar production line of FIG. 5A.
Figure 5A:
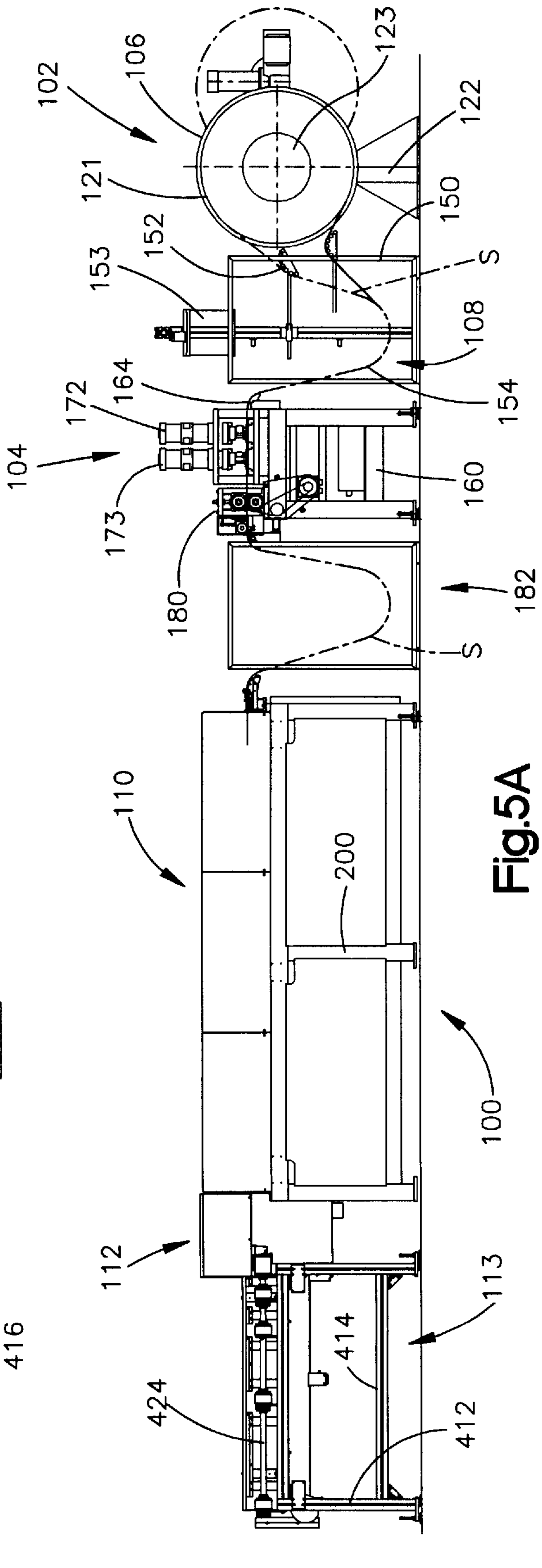
FIG. 5A is an elevation view showing a muntin bar production line constructed according to the invention.

FIGS. 5A and 5B depict a muntin bar production line 100 constructed according to a preferred embodiment of the invention. The production line 100 comprises a stock supply station 102 from which stock sheet material is fed to a first forming station 104. At a second forming station 110 downstream from the first station 104 the sheet is formed into an elongated tubular muntin bar. At a third forming station 112 an endmost tubular muntin bar is separated from the muntin bar tube to form an individual muntin bar. Each severed end bar is moved away from the severing station by an end station conveyor.

Figure 7:
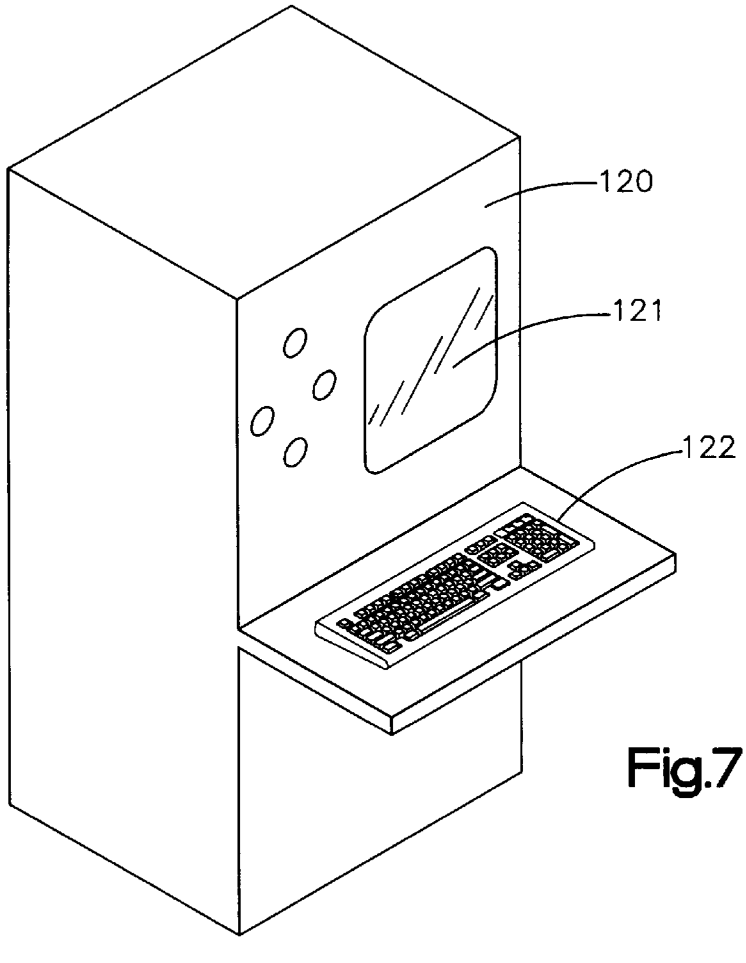
FIG. 7 is a perspective view of a control unit that co-ordinates the fabrication steps performed along the production line as the muntin bars are fabricated.
Figure 9A:
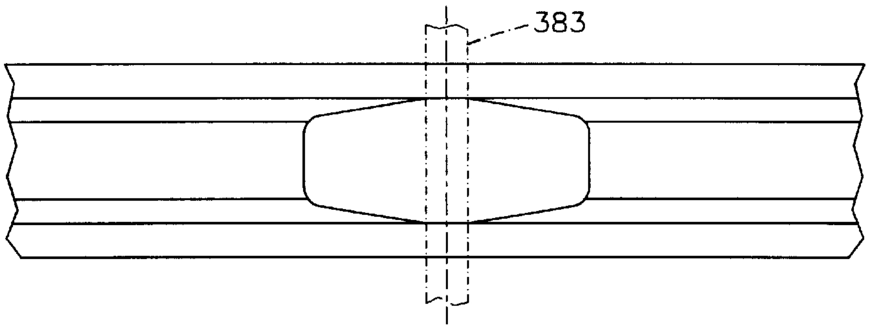
FIGS. 9A through 9D are a series of plan views showing steps of severing of a muntin bar from an end of a strip of stock material and then finishing a mitred end of said severed muntin bar.
Figure 9B:
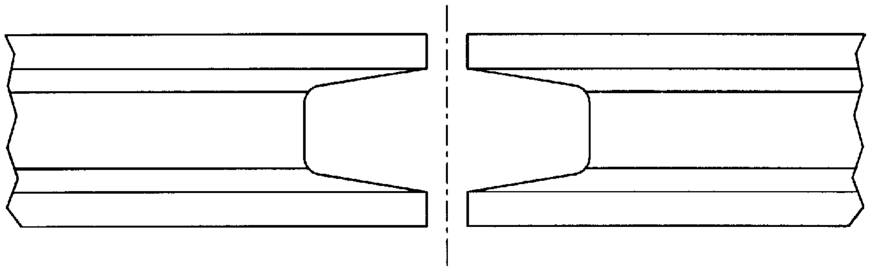
Figure 9C:
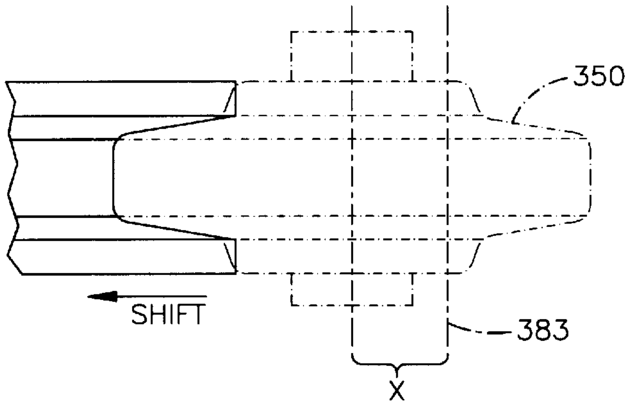
Figure 9D:
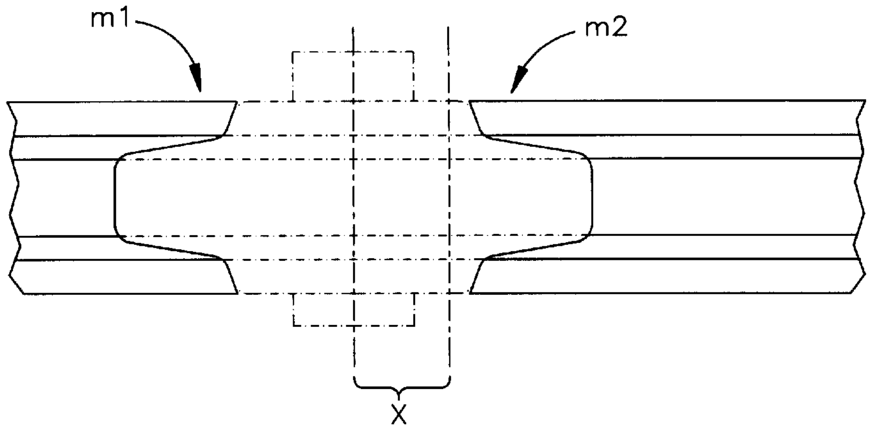

A scheduler/motion controller unit 120 (FIG. 7) is preprogrammed to co-ordinate and to control the various stations of the production line 100 in order to govern muntin bar size, the stock feeding speeds in the line, activation of the forming stations, and other parameters involved in production. Most preferably the controller unit 120 includes a programmable controller having a central processing unit that presents a user interface to allow the forming steps performed by the production line 100 to be changed during set up of the line 100.

Figure 6:
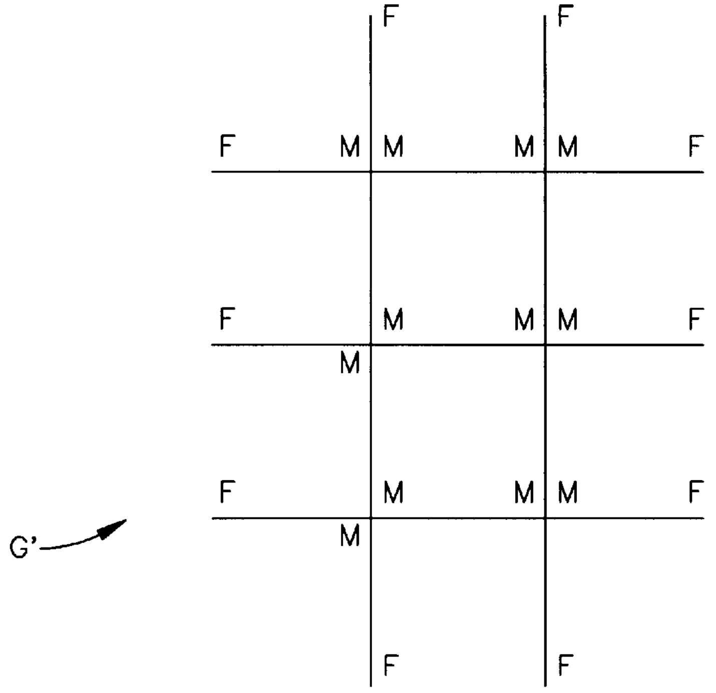
FIG. 6 is a schematic depiction of a completed muntin bar grid showing the locations for mitred and flat muntin bar ends of the muntin bars forming the grid.

The production line 100 that operates under control of the controller unit 120 produces sequences of muntin bars that make up a grid. The grid G' of FIG. 6 is one such grid. This grid is made up of eleven different muntin bars having different lengths and different end configurations which are used in a particular window size. When a different size window and hence different length and width spacer frame is needed, the user need merely enter dimensions of the frame into the controller unit 120 and indicate the number of panes that the grid needs to define and the newly specified grid is produced by the production line. The last muntin bar of the previous grid G' and the first muntin bar of the newly specified grid can be produced one after the other without inconvenience of extended machine setup or production of scrap produce between jobs.

Units can be different from unit to unit in configuration, size, offset and color. In addition, some units will contain muntin bars having multiple colors and stock sizes. Multiple orders for all required units are inputted into the controller. The controller schedules the order in which the muntin bars will be made to maximize efficiency. The software in the controller filters the muntin bars required for each grid by a common stock inventory type. The controller 120 makes all the muntin bars for a selected stock or inventory type for a particular grid, groups them and moves on to the next grid needing muntin bars made of the selected stock or inventory type, until all scheduled muntin bars of a particular inventory type are made. The next roll of ribbon stock or inventory type is loaded into the machine and all the scheduled muntin bars for that stock or inventory type are made and grouped. For example, if 1.5" stock with white finish is loaded in the machine, the controller will make and group the muntin bars for all scheduled grids that are made from 1.5" stock and are white before routing orders for muntin bars made from a different stock or inventory type. These convenience features are not available during muntin bar fabrication processes used in the prior art.

The Stock Supply Station 102

The stock supply station 102 comprises a support 106 for coiled ribbon stock 121 and a loop feed sensor 108. The ribbon stock S typically has a finished surface that forms the exterior of the muntin bar and thus should not be scratched, marred or otherwise damaged during production of the muntin bars. The stock is uncoiled from the support 106 and fed to the loop feed sensor 108. The ribbon stock support 106 comprises a vertical support column 122 extending upwardly to a coil support unit and a stub axle assembly 123 which supports the coiled stock. The axle assembly 123 is provided with a coil clamping reel structure (not shown) at its projecting end on which the coil is received. A drive motor and transmission assembly (not shown) drives the axle assembly 123 to feed stock from the support 102. The clamping reel structure is adjustable to receive coils having different widths depending upon the size of the muntin bars to be produced by the production line 100.

The loop feed sensor 108 coacts with the controller unit 120 to control the motor of supply station 102 to prevent paying out excessive stock yet assuring a sufficiently high feeding rate through the production line 100. The loop sensor 108 comprises a stand 150 positioned adjacent the stock support 106, a first arcuate stock guide 152 for receiving the stock from the support 106, and a loop signal processing unit 153. Stock fed to the sensor 108 from the support 102 passes over the guide 152, droops in a catenary loop 154 and passes over a second arcuate stock guide 164 (which forms part of a first forming station, described below) upon exiting the loop sensor 108. The depth of the loop 154 is maintained between predetermined levels by the unit 153. The unit 153 includes an ultrasonic loop detector which directs a beam of ultrasound against the lowermost segment of the stock loop. The loop detector detects the loop location from reflected ultrasonic waves and sends a signal to the controller unit 120 which in turn controllably activates the motor that drives the axle assembly 123.

The First Forming Station 104

The first forming station 104 is preferably in the form of a material removal station that receives stock from the loop sensor 108 and performs a precise punching operation on the stock as it is held in position. In the preferred embodiment, the forming station 104 comprises a supporting framework 160 fixed adjacent the loop sensor, and first and second stock punching units 162, 163 carried by the framework 160. The preferred forming station 104 can removes material from the strip S to form one of the three notch patterns P1 & P3 of FIG. 3. In FIG. 3, the designation P2 is a notch pattern that produces a flat muntin bar end F that abuts the spacer frame, the designation P3 is a notch pattern that produces a >mitered end M meaning a muntin bar end that fits over a side of a transverse muntin bar and is attached by means of a joiner clip 28, and the designation P1 is for a notch pattern that produces an elongated slot 30 to accommodate a clip 28 at an appropriate position along the side of the muntin bar.

Figure 11:
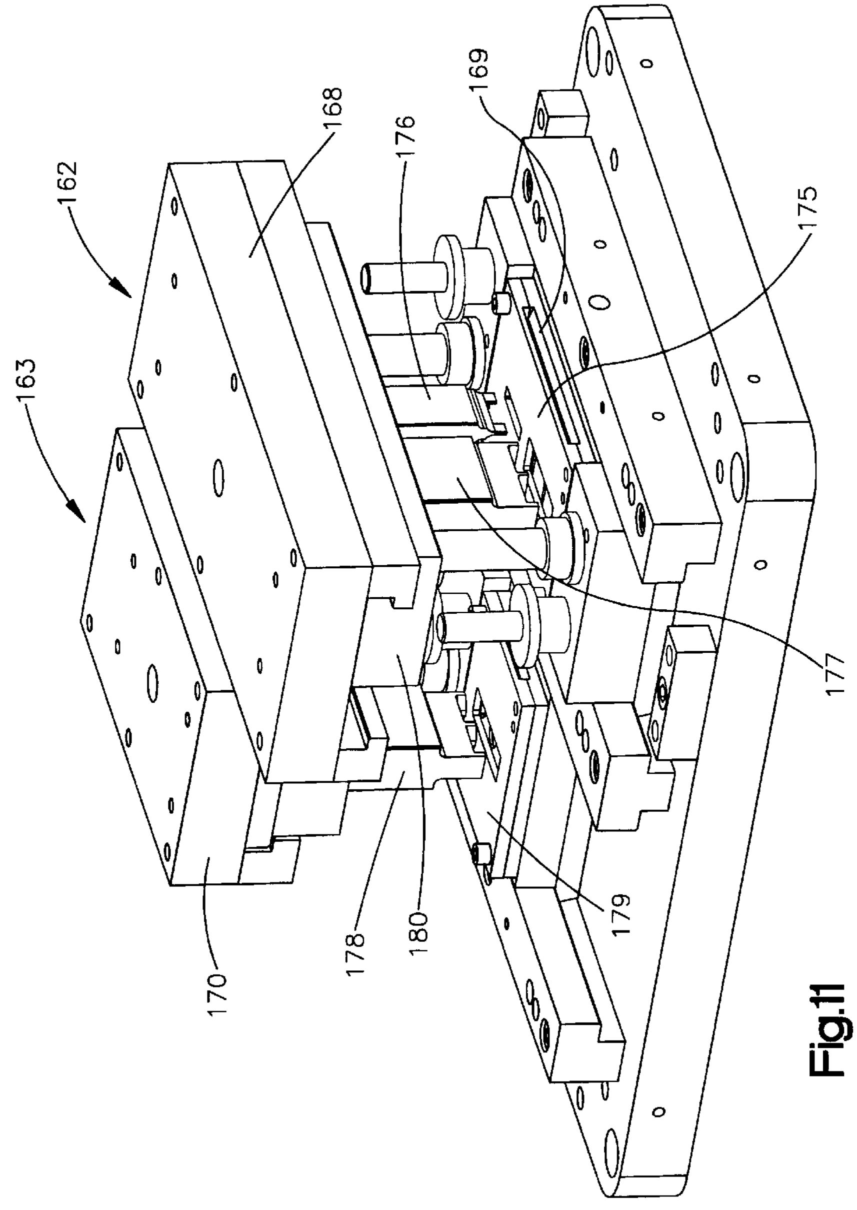
FIG. 11 is a perspective view of a punching station that notches the sheet material.

The framework 160 has an arcuate stock guide 164 that directs the stock from the sensor 108 through a ribbon path of travel P extending through the stations of the production line 100. The first punching unit 162 (FIG. 11) has a notching assembly 168 mounted for up and down movement and is driven by a first ram assembly 172. The second punching unit 163 has a notching assembly 170 that is also mounted for up and down movement and is driven by a second ram assembly 173. The notching assembly 168 is positioned over a lower die, or anvil, 175 disposed beneath the stock travel path P and includes first and second upper punches, or hammers, 176, 177 disposed above the travel path. The hammers 176, 177 have sharpened edges to punch through the stock. The stock passes through an opening 169 in the anvil 175 as it enters the punching unit 162. The controller 120 stops the stock feed when the location for a notch is properly located between the dies. The anvil clamps the strip material S.

The two hammers 176, 177 and the anvil 175 that backs these hammers are mounted to a slide 180 that is moved back and forth transverse to the direction of movement of the stock S so that the controller 120 can punch an appropriate one of the notch patterns. A suitable drive such as an air actuated cylinder coupled to a pressure source PS moves the slide and attached hammers 176, 177 to cause the appropriate hammer to be positioned relative to the stock material S when the ram 172 is actuated. The hammer 176 has two narrow punches that create the pattern P2. The hammer 177 forms the pattern P1. The second notching assembly 170 has a single die and anvil pair 178, 179 that are brought together by actuation of the second ram assembly 173 to punch the pattern P3.

The ram assemblies 172, 173 are securely mounted atop the framework 160 and connected to a source P1 of high pressure operating air via suitable conduits (not shown). The ram assemblies 172, 173 are operated from the controller 120 which outputs a control signal to a suitable conventional ram controlling valve arrangement (not shown) when the stock has been positioned appropriately for punching. The stock is fed to the station 104, stopped at a location which properly positions the stock relative to the punching units 162, 163 and an appropriate one of the two ram assemblies is operated under control of controller 120 to cause the punching unit to remove the desired portion of the stock. Upon completion of punching, stock feed resumes. When the next location for removing material from the stock passing through the line 100 is reached, the stock feed is stopped again and an appropriate one of the two punching units 162, 163 is actuated.

A servomotor 180 attached to the framework 160 feeds the strips to a second loop sensor 182. The depth to which strip S droops in this sensor 182 is monitored by a sensor and so long as the strip is within a specified range the servomotor 180 is de-energized. As the strip is fed through the second forming station 110 the strip is taken up until its level triggers the sensor causing the control unit 120 to activate the motor 180.

The Second Forming Station 110

Figure 15:
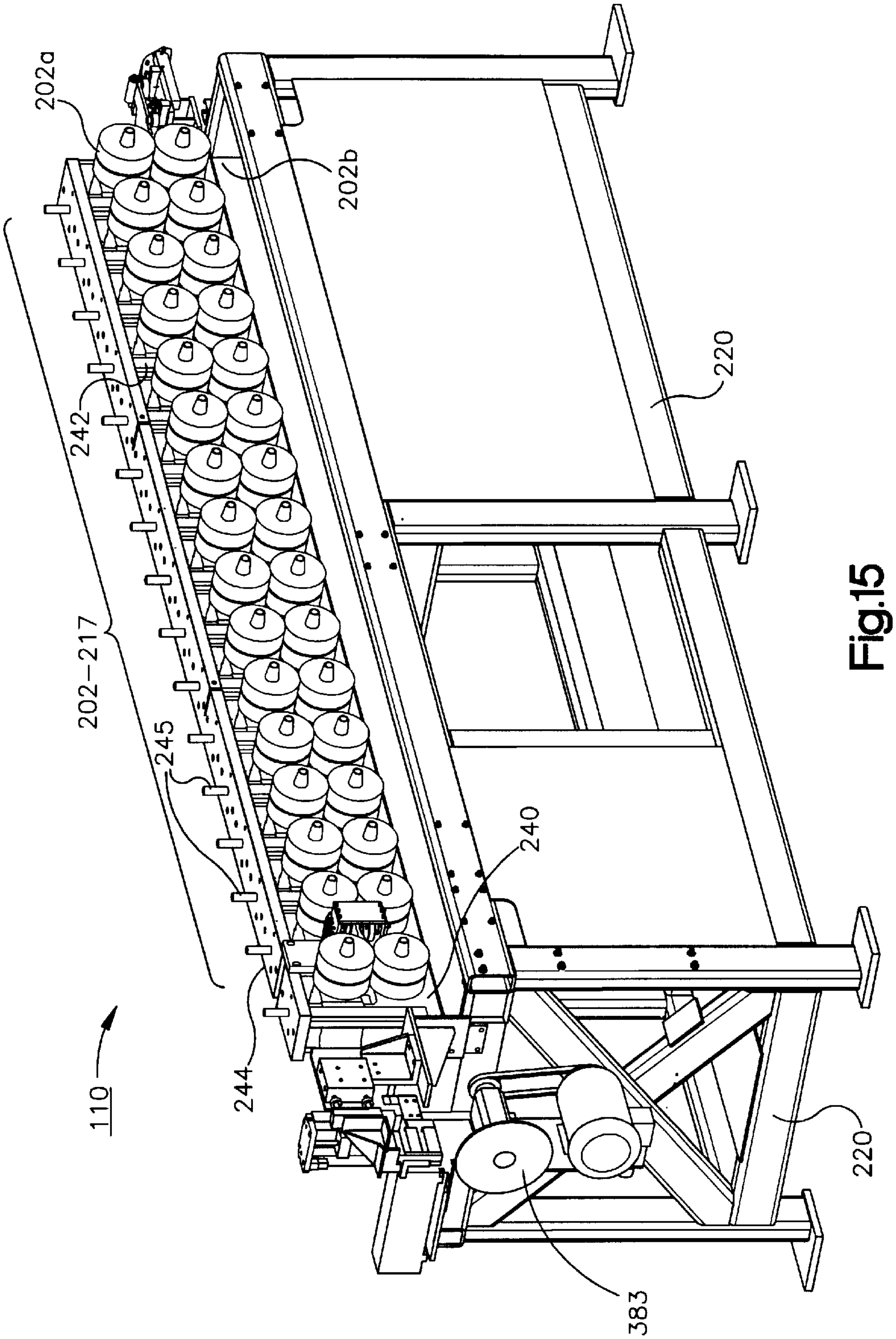
FIG. 15 is a perspective view of a sequence of multiple roll assemblies that make up a muntin bar forming station.
Figure 16A:
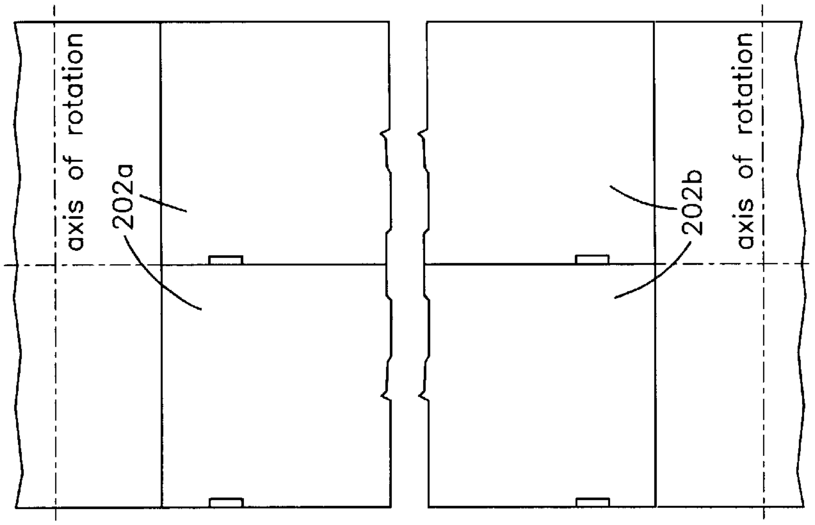
Figure 17A:
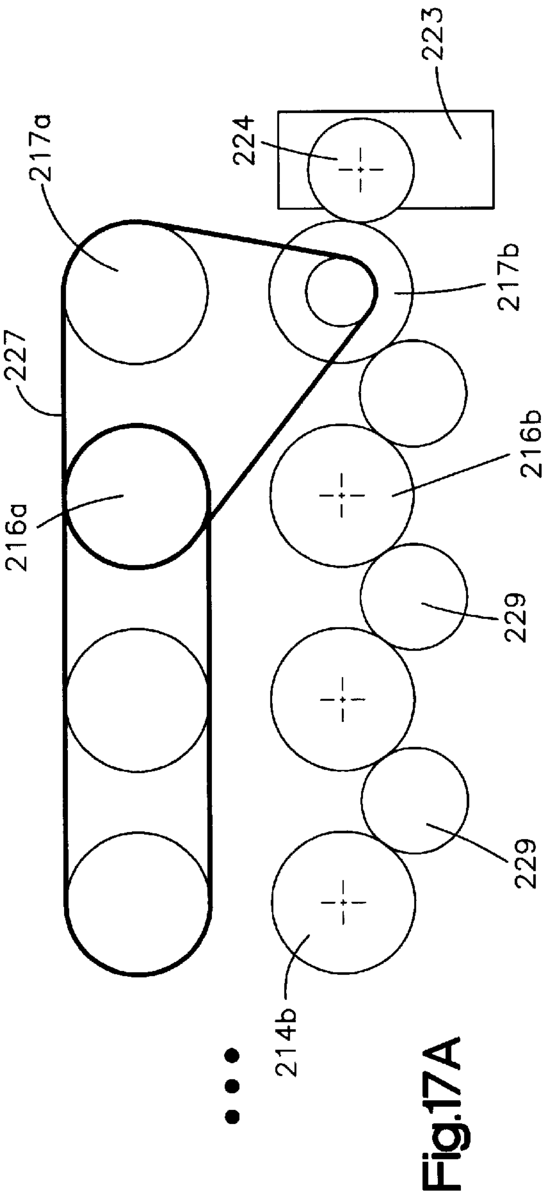
FIGS. 17A and 17B are elevation and plan views of a portion of a drive transmission for the roller assemblies that make up a second forming station.
Figure 17B:
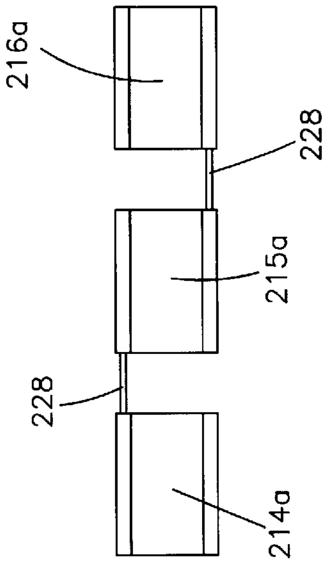

The second forming station 110 is preferably in the form of a rolling mill that roll forms the stocks received from the first forming station 104 into a tubular muntin bar T. In the preferred embodiment of the invention, the second forming station 110 comprises a support frame structure 200 and sixteen sequentially mounted roll assemblies 202 & 217 (FIG. 15) carried by the frame structure 200. The roll assemblies each include top and bottom rolls (the first assembly of FIG. 16A has rollers 202*a*, 202*b* for example) that are driven by a drive transmission system (FIGS. 17A and 17B) for simultaneously driving all sixteen roll assemblies.

The support frame structure 200 comprises a base 220 positioned in line with the stock path of travel P immediately adjacent the first forming station 104. A roll supporting frame assembly extends along opposite sides of the stock path of travel P with the stock path of travel P extending centrally therethrough. The roll supporting frame section supports the roll assemblies 202–217.

Each roll assembly is supported by a lower support beam 240 and an upper support beam 244 that extend along substantially the entire length of the rolling mill beneath roll assemblies 202–217. A series of spaced apart vertical upwardly extending stanchions 242 are fixed to the beams 240 and 244, one pair of vertically aligned roll pairs are supported between each successive pair of the stanchions 242. Each pair of rolls extends between a respective pair of stanchions 242 so that the stanchions provide support against relative movement in the direction of the travel path P. The stanchions 242 also secure the rolls together for assuring adequate engagement pressure between the rolls and stock passing through the roll nips formed by an assembly.

In the preferred embodiment of the invention, each roll assembly 202–217 is formed by pairs of vertically aligned upper and lower rolls that define a single "pass" of the rolling mill. Each roll assembly 202–217 comprises a bearing housing, upper and lower roll shafts extending through a bearing in the housing, and upper and lower stock forming rolls respectively disposed on the inwardly projecting ends of the shafts. One or more guide rolls are provided adjacent the forming rolls to ensure the ribbon stock is moved through the roll nips without bending or kinking. The bearing housings are captured between adjacent stanchions 242. Drive pulleys or sprockets for rotating the rolls are disposed on the opposite ends of shafts and project laterally outwardly from the support unit.

The upper support beam 244 carries a nut and screw force adjuster combination 245 associated with the upper roll of each roll assembly 202–217 for adjustably changing the gap between the two rolls of a roll assembly. The adjuster comprises a screw threaded into the upper roll bearing housing and lock nuts for locking the screw in adjusted positions. The adjusting screw is thus rotated to positively adjust the position of each upper roll relative to its corresponding lower roll, the lower support beam 240 fixedly supporting the lower roll of each roll assembly. The force adjusters enable the rolls in each pair to be moved toward or away from each other to increase or decrease the force with which the roll assemblies engage the stock passing between them.

A drive transmission system (FIG. 17A) comprises a motor 223 fixed to the base and is preferably an electric servomotor energized by the controller unit 120. The motor speed can be continuously varied through a wide range of speeds without appreciable torque variations. The motor 223 is preferably disposed on its side with its output shaft extending horizontally and laterally relative to the stock path of travel P and connected to a drive sprocket 224. The drive sprocket 224 is coupled to the roll assemblies 202–217 so that the roll assemblies are positively driven whenever the servomotor is operated. The sprocket 224 drives a sprocket attached to the bottom roller **217*b* of the last stage which drives a chain 227 reeved around a pair of drive sprockets connected to the top rollers 217*a*, 216*a*. A drive chain 228 couples adjacent pairs of top rolls 216*a*, . . . 202*a*. The drive chain is reeved around the drive sprockets of each top roll of each of the roll assemblies 202–217. The bottom rolls 216*b* . . . 202*b* are interconnected by idler sprockets 229. Accordingly, whenever the motor 223** is driven, the rolls of each roll assembly are positively driven in unison.

The forming rolls of the roll assemblies 202–217 are configured to progressively form the ribbon stock from a flat sheet S into a tubular muntin bar T. Successive stages of the rolling mill bend the sheet S into a tubular bar T as seen in FIG. 4. The first roll assembly 202 is shown in greater detail in FIG. 16A. The rolls **202*a*, 202*b* bend the planar sheet S to produce a center plateau 232 bounded by two valleys 234, 236. The rolls 202*a*, 202*b* also produce two outer segments 238, 240 angled with respect to the two valleys 234, 236. At the extreme edges of the sheet S the rolls 202*a*, 202*b* form upwardly bent lip segments 239**.

As the strip S passes through the next three subsequent stages (roll assemblies 203, 204, 205), the outer lips 239 are further bent until after the stage defined by the roll assembly 205 the lips 239 form an angle 'a' with respect to the outer segments 238, 240 as seen in FIG. 4. In the completed tubular muntin bar T the two lips on opposite sides of the strip are bent toward each until they touch and form a seam 242. The tubular muntin bar T formed by the station 110 has notch patterns P1, P2, P3 punched at precisely located positions along the length of the tubular muntin bar.

The angle 'a' between the segments 238, 240 and the extreme end portion or lip 239 stays the same until the fifteenth stage where the lip 239 is again bent inward to form the seam 242 along a line of engagement of the two lips 239. FIG. 16B shows the seventh stage (roll assembly 208) illustrating that the rollers **208*a*, 208*b* do not engage and therefore do not further bend the lips 239 as the strip passes through the rollers 208*a*, 208*b*. Experience with the roll forming station indicates this process of delaying the last bending until the next to last roll assembly reduces the build up of stress within the tube T. This in turn tends to reduce splitting open of the seam and the muntin bar end where the bar is severed from the tube T. The fifteenth and sixteenth roll assemblies 216, 217 are the same shape. The second roll assembly 217** straightens the completely bent tubular muntin bar prior to severing individual muntin bars from the strip.

Figure 16C:
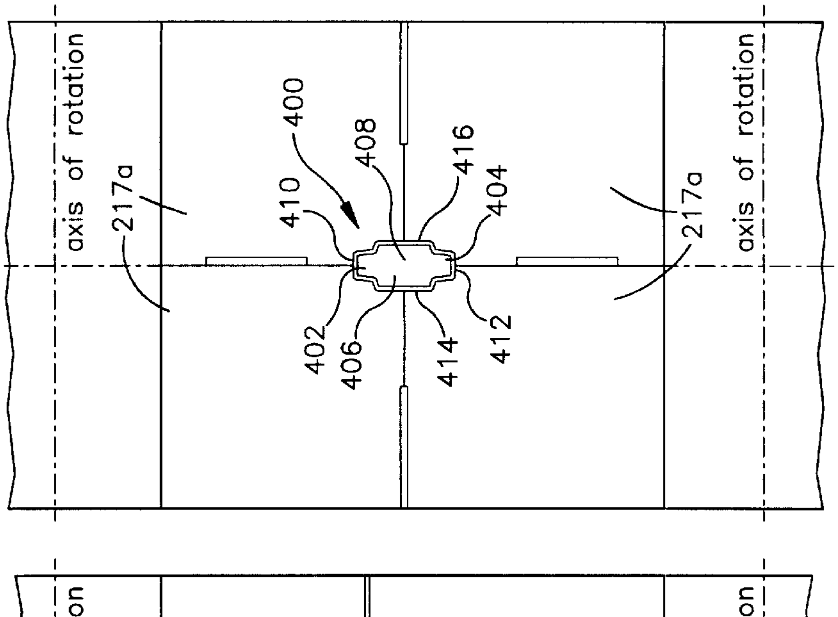
FIGS. 16A, 16B, and 16C show conforming roller surfaces of three representative roller assemblies.
Figure 16B:
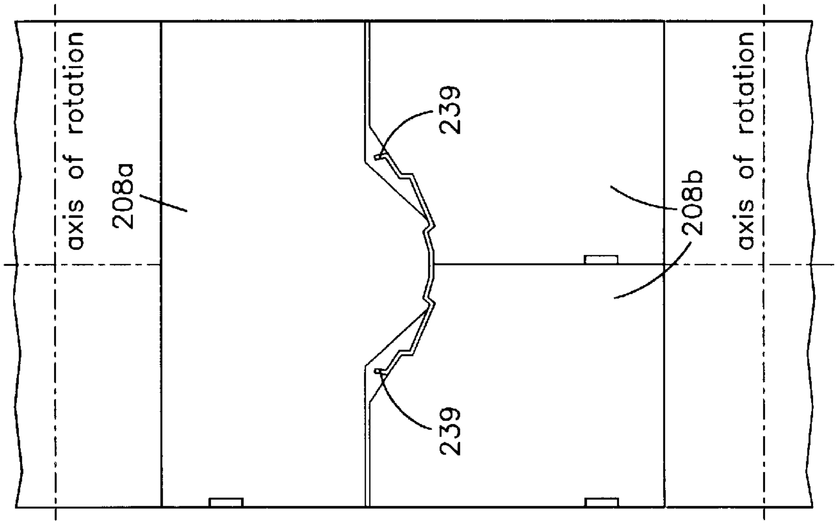

FIG. 16C shows the cross section 400 of a completed muntin bar. The cross section 400 defines a perimeter that encloses an area having the general shape of a cross. The cross-shaped area defined by the perimeter of the formed muntin bar has two relatively narrow top and bottom legs 402, 404 and two relatively wide side legs 406, 408. The ends 410, 412 of the top and bottom legs are generally parallel to one another and the ends 414, 416 of the two side legs are generally parallel to each other. The length of the top and bottom legs 402, 404 is the same and the length of the two side legs 406, 408 is the same. The width of each leg tapers down along its length, so that the angle formed by the side of one of the top or bottom legs and the side of one of the side legs is an obtuse angle. A seam is formed at the end of one of the legs where two edges of the material used to form the tube meet. In the exemplary embodiment the seam of the muntin bar is in the center of the top leg.

The Third Forming Station 112

The third forming station 112 is a muntin bar severing and finishing station that severs an endmost tubular contoured muntin bar as it exits the forming station 110 and delivers it to a convey at the end station. In the case of a mitred end defined by the notch pattern P3 the station 112 also performs a finishing step to allow the mitred end to accurately overlap and engage the elongated muntin bar (22 in FIG. 2A) with it mates. In the preferred embodiment, the third forming station 112 is fixed to the end of the frame 200 that supports the roll assemblies. A saw that performs a severing step is attached to a vertical slide 306 attached to the framework 302. Up and down movement of the slide 306 causes the saw to move in and out of the path of the strip to sever an endmost muntin bar from the elongated tube T of connected muntin bars formed in the second forming station 110.

Three optical sensors 308, 309, 310 (FIG. 14) that are mounted to monitor movement of the tubular muntin bar T at the third forming station. Output from the sensors allow the controller 120 to determine a type of notch pattern (P1, P2 or P3) that was formed in the strip S prior to bending of the strip into the tube T. Two sensors 308, 309 look across the tube T and one sensor 310 senses the tube from above the path of tube movement.

Figure 14:
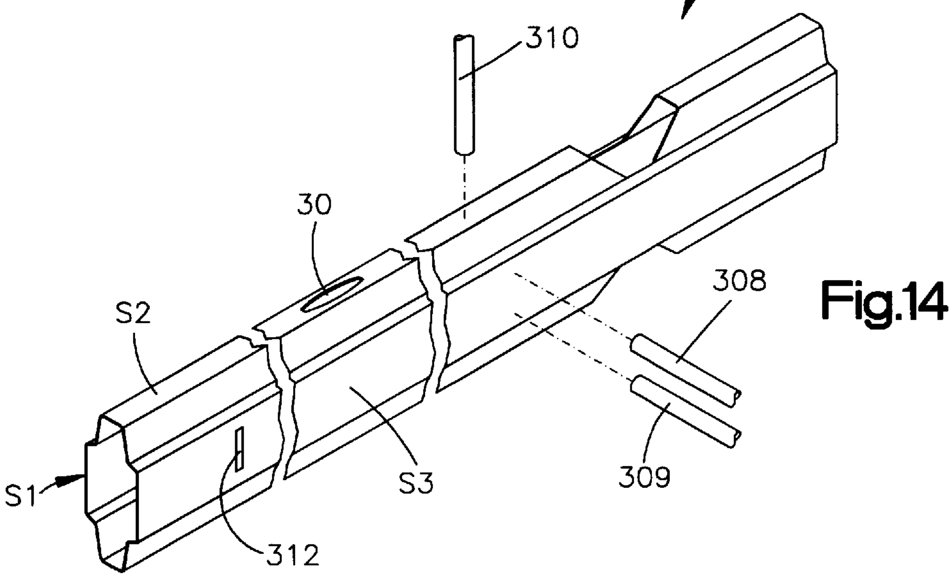
FIG. 14 is a perspective view of a tubular muntin bar showing a manner in notch patterns are detected prior to severing an endmost muntin bar.

Turning to the schematic depiction of FIG. 14, one sees that the notch pattern P1 produces two narrow slots 312 on opposite sides of the tube T that disrupt the surfaces S1, S3. Light from the sensor 308 striking the slot 312, for example does not bounce off the surface S1 but instead passes through the tube T to a sensor receiver (not shown) on an opposite side of the tube T. The receiver sends and appropriate signal to the controller 120.

If the sensor 310 senses a notch along the surface S2 it can either be a side slot 30 to accommodate a clip or it can be the notch for a mitred end. In either event, a receiver beneath the tube T will pick up a signal from the sensor transmitter. To distinguish between a slot and a mitred end, the output from the sensor 309 is used. When this slot 30 is sensed, the computer 120 does not activate the saw and the slot 30 is allowed to pass through a severing region of the third forming station.

During operation of the sensors 308–310, the controller 120 waits until a signal is received from either sensor 308 or sensor 310. Assume the sensor 310 is activated. If the sensor 309 is not also activated a slot 30 from the pattern PI has been sensed and no cut is performed. If a signal sensor 310 is received and also from sensor 309 through a mitred end pattern P3 has been sensed. A signal from only sensor 308 means a cut only pattern P2 has been sensed.

Figure 12:
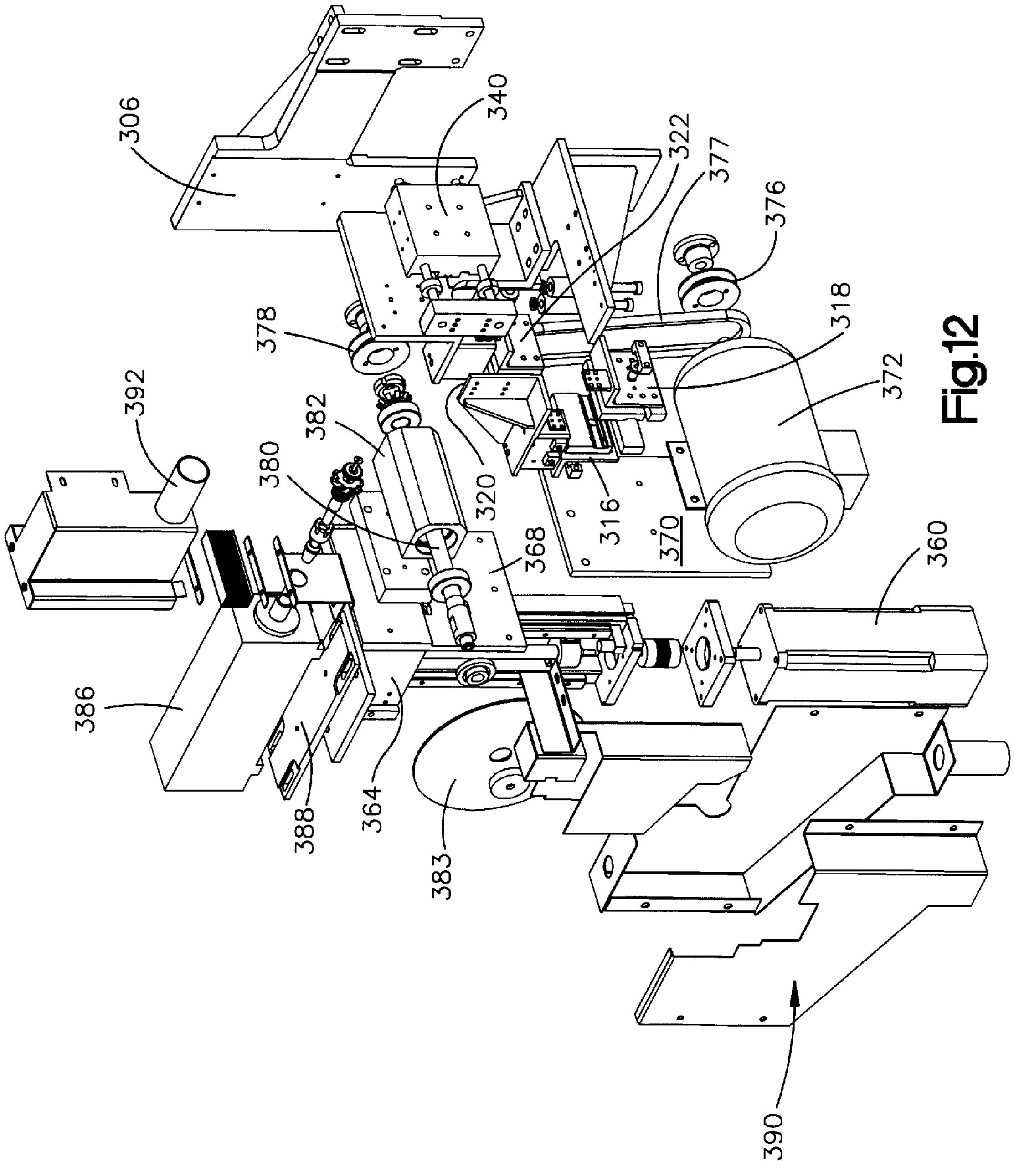
FIG. 12 is a perspective, exploded view of a sever/finish station of the production line.

When one of the two narrow registration slots 312 which define the position of the flat end F of the muntin bar are sensed, the controller 120 clamps the muntin bar tube T in place and moves the saw up from its home position through the region of the muntin bar strip T to sever the endmost muntin bar. A downstream clamp 314 includes first and second moveable clamp members 316, 318 having clamping surfaces facing inwardly to clamp the muntin bar tube T downstream of the severing region. A second, upstream clamp 320 includes first and second moveable clamp members (only one is depicted in FIG. 12) having clamping surfaces facing inwardly clamp the muntin bar tube T upstream of the severing region. Both clamps are actuated to clamp the tube T prior to severing.

A mitred end notch pattern P3 (sensed by the sensors 309, 310) is interpreted by the controller 120 as requiring first a severing of the strip S through a midpoint of the semicircular notches 330, 332 and secondly a finishing of the two mitred bar ends. One of these mitred ends is the upstream end of the separated muntin bar and a second mitred end is the downstream end of a soon to be severed muntin bar still attached to the tube T. As in the case of a flat end F, when forming two facing mitred ends M, the tube T is first clamped on either side of the severing region and then the saw is moved up from its home position to sever the endmost muntin bar.

Figure 10:
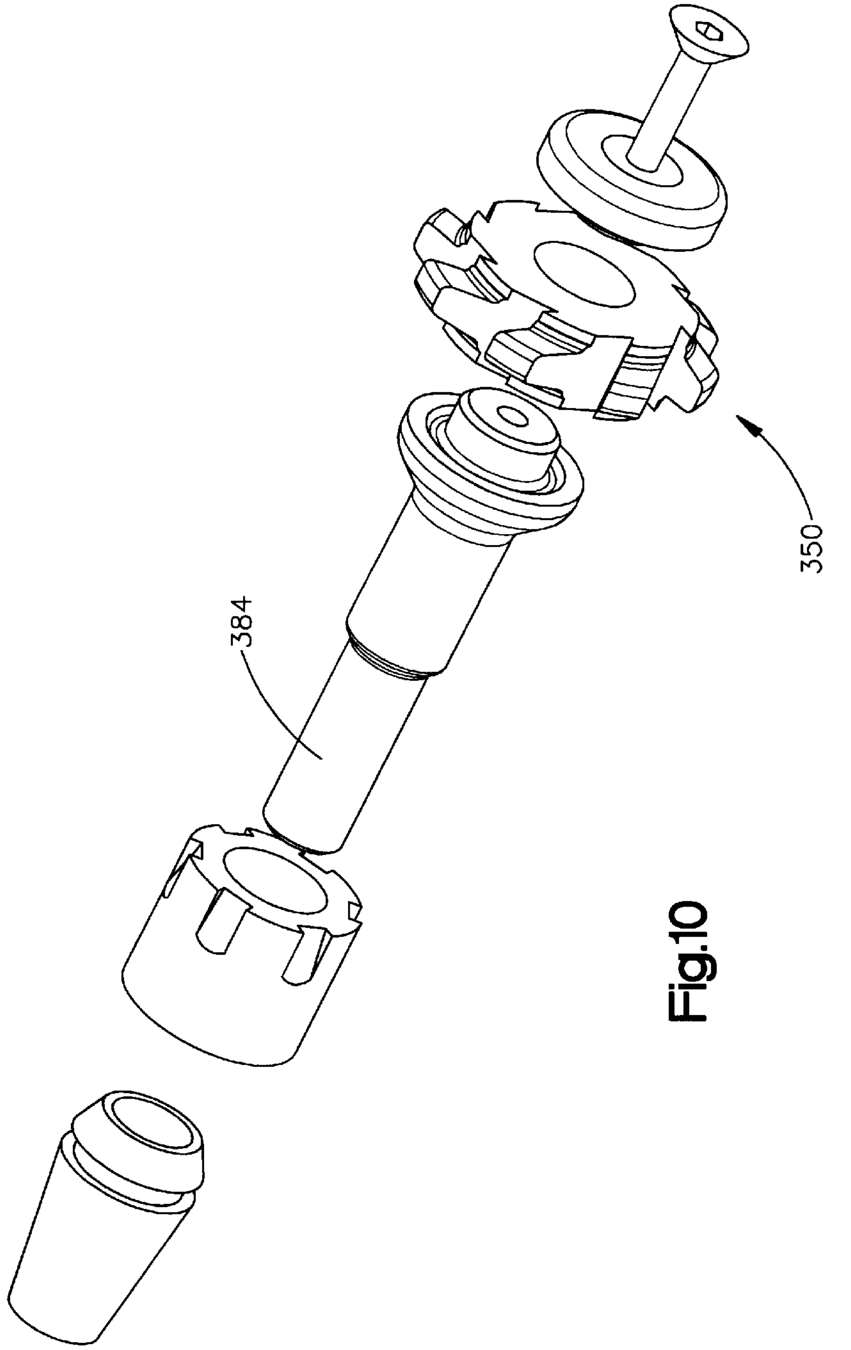
FIG. 10 is a perspective view of a router bit used to perform a finishing step on mitred muntin bar ends.
Figure 13:
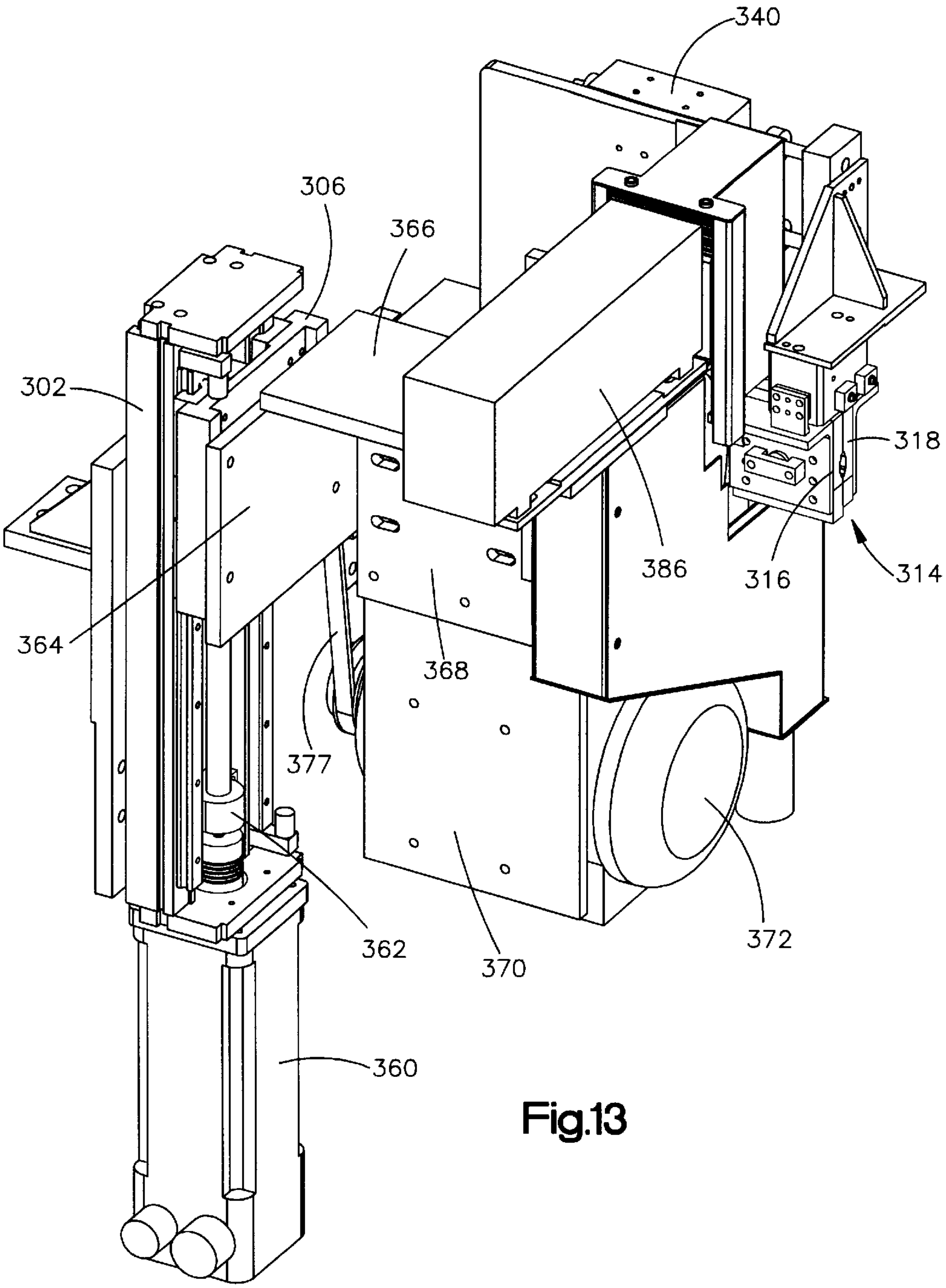
FIG. 13 is a perspective view of the sever/finish station.

To perform the finishing step, as the saw is retracted away from the severing region, the still clamped and now severed muntin bar is shifted an appropriate distance 'X' in the direction of bar movement. This brings the two oppositely facing severed ends of the tube a distance D apart. To accomplish this side shifting of the severed muntin bar the two downstream clamp members 312, 314 are mounted for movement along the travel path of the tube T. After the severing of an endmost muntin bar, the clamp members are shifted downstream by a clamp drive 340 to widen the gap between the mitred ends M1, M2. The controller 120 then causes an appropriately configured router bit 350 (FIG. 10) rotating at a high rate of speed to pass between the two mitred ends M1, M2. By shaving off portions of specific regions 352, 353, 354 of the mitred ends M, the completed muntin bar will overlie the transverse muntin bar at the region of the clip. If the finishing step is not performed, the mitred end would only fit over but not properly seat against the surfaces S2, B1, B2 of the transverse muntin bar 22. The sequence of severing a clamped end of the tube T, shifting a severed bar downstream and moving a router bit 350 between the two mitred ends M1, M2 is depicted in the sequence of FIGS. 9A–9D. The perspective assembly view of FIG. 12 and the exploded perspective view of FIG. 13 more completely depict components of the third forming station 112. The saw is preferably mounted to the platform 306 so as to be movable into cutting engagement with the tubular muntin bar tube T upon receiving an appropriate control signal from the controller 120. As depicted in the drawings, a suitable actuator for moving the saw includes the combination of a servo motor 360 and a ball screw linear actuator 362 coupled to the platform 306. The linear actuator moves three inter-connected brackets 364, 366, 368. The third of these brackets 368 supports the saw for up and down movement relative to the travel path of the tube T. The bracket 368 also supports a motor mount 370 which in turn supports a motor 372 having an output shaft 374 and attached pulley 376. Reeved over the pulley 376 is a belt which engages a second pulley 378. The second pulley 378 is attached to a shaft 380 that extends through a bearing housing 382. On an opposite side of the housing 382 the shaft 380 supports a circular saw blade 383 for rotation. The housing 382 is attached to the bracket 368 so that the motor moves in unison with the saw.

In its home position the router is spaced above the tube T. By raising the saw, the controller severs the muntin bar. By lowering the router bit 350 the controller finishes the mitred ends M of the muntin bars. The router bit is supported by a shaft 384 that extends from a high speed (23,000 rpm) motor 386. The motor 386 is attached to a router mount 388 coupled to the bracket 366 and also moves up and down with the saw blade.

The severing and routing steps create a good deal of scrap material in the region of the clamps. A saw blade shroud 390 is attached to the bracket for up and down movement with the saw blade to impede debris from flying away from the blade region. A router bit shroud 392 is attached to the motor 386 and includes a cylindrical extension having a source of suction (not shown) that removes debris from the region of the router bit 350 as the mitred ends are finished.

The End Station 113

The production line has a conveyor C that carries the muntin bars away from the stock path of travel P. The illustrated conveyor comprises a frame with posts 412 and rails 414 supporting a plurality of conveyor belts 416 that extend across the upper portion of the conveyor frame, the belts being reeved around sprockets or pulleys 418 rotatably mounted to the frame. A motor 420 drives a gearbox and drive belts to rotate a drive shaft 424, which in turn rotates the sprockets to drive the conveyor belts 416. The conveyor belts 416 preferably engage the individual muntin bars and convey the bars transversely away from the path of travel P.

The conveyor C moves muntin bars away from the path of travel of the muntin bars in batches or groupings. All the bars depicted in FIG. 6, for example, are produced serially and come off the conveyor in a direction generally perpendicular to the direction of movement as they are being punched, cut, shaped etc.

The Controller Unit 120

In the preferred embodiment of the invention, the controller unit 120 (FIG. 7) comprises a personal computer having a display monitor 121, an operator accessible keyboard 122, and a central processing unit (CPU) which governs operation of the production line 100. The CPU includes a programmable microprocessor that executes a control program containing a schedule of operations to be performed to produce a batch of individual muntin bars suitable for subsequent assembly into a grid such as the grid G of FIG. 2A or the grid G' of FIG. 6. The microprocessor commands control feeding the stock from supply station 102, and processing of the stock at stations 104, 110, 112 and 114. These stations are coupled by a link or line of communication between each of the various stations and the controller 120. The control program thus dictates the production schedule of the muntin bars manufactured by the production line 100. Accordingly, when the muntin bars for a given size insulating glass unit, such as the unit 10 of FIG. 1, are to be produced, the stock is fed from supply station 102 and a signal is output from the loop feed sensor 108 to the controller unit 120. The controller unit 120 speeds up, slows or stops the supply station motor to control the feed rate of stock to the production line 100.

The stock is fed to the first forming station 104 with the controller 120 monitoring the feed rate of stock and stopping the feed during activation of the two punching units 162, 163. The stock feed resumes and the notched stock is fed to the second forming station 110 where it passes through the rolling mill and is formed into a tubular muntin bar T.

The controller 120 controls the third forming station 112 to sever the tubular muntin bar into appropriately sized individual muntin bars, the sensors 308, 309, 310 transmit data to the controller 120 regarding the flow of stock through the line as discussed above. The sensors 308, 309, 310 transmit a signal that correctly indicates position of stock in the line even if slippage occurs, due to the encoder signal being generated by optical sensing of the tubular member. Additionally, if desired, the controller 120 may govern operation of the conveyor C in removing the finished muntin bars from the stock path of travel P, for example, by conveying the muntin bars to another location (not shown) where they are assembled into a grid for use in an insulating glass unit such as that shown in FIG. 1. The conveyor C is activated independently of the drive system for moving the strip and tubular bars to the severing station. This allows the controller 120 to maintain movement of the bars that make up a completed grid G and provide a spacing between completed grids. When the last bar of a particular stock type to a particular grid is completed, the controller 120 maintains movement of that endmost bar away (in a transverse direction) from the severing and finishing station while suspending movement of the first muntin bar of the next grid. A spacing between the multiple muntin bars for a particular grid results. This spacing allows the operator to identify those bars that make up a completed grid so that they can be grasped by the operator and either assembled immediately into a grid or placed aside for assembly at a separate location.

While the invention has been described in detail with respect to the preferred embodiments thereof, those skilled in the art will appreciate that many changes and modifications may be made thereto without departing from the spirit scope of the invention as defined in the claims.

We claim:

1. Apparatus for making a contoured muntin bar comprising:

a) a supply of sheet material having a finished surface on at least one side in the form of a coiled ribbon;

b) a driver for uncoiling the ribbon from the supply and feeding the ribbon through a succession of forming stations positioned along a travel path;

c) a ribbon punch for punching the ribbon at a precisely predetermined location along the ribbon to form a notch in the ribbon, the notch being a selected one of a plurality of different notch patterns; said notch defining a portion of a contoured muntin bar;

d) a forming station comprising a succession of forming rolls having a succession of forming roll nips to bend the ribbon as said ribbon moves along the travel path and form an elongated, generally closed cross-sectional tube having raised planar sections on opposite sides of said tube;

e) a cutting station comprising a muntin bar severing apparatus for severing an endmost muntin bar from the cross-sectional tube at a precisely predetermined location by cutting the tube along a cut line that intersects a notch of the cross-sectional tube;

f) a process controller for sensing movement of the ribbon as said ribbon is unwound from the supply and producing control signals for activating the ribbon punch; and g) a sensor for monitoring movement of the ribbon and sensing notches formed in the punch patterns and sending sensor signals to the controller for initiating the severing of the endmost muntin bar.

2. The apparatus of claim 1 further wherein said process controller includes instructions to produce a plurality of muntin bars constructed for assembly into a single grid.

3. The apparatus of claim 1 further wherein said process controller includes instructions to produce all required muntin bars of a first stock type before producing muntin bars from a second stock type.

4. An apparatus for making muntin bars comprising:

a) an uncoiler for supporting coiled ribbon stock;

b) a notching device for receiving ribbon stock from the uncoiler, the notching device having a number of individually activated punches to form different notch patterns along the length of the ribbon stock;

c) a roll forming machine having a plurality of roll assemblies adapted to receive ribbon stock from the notching device and form in stages a hollow contoured muntin bar tube having at least two raised portions that extend along said tube; and d) a severing device for severing the muntin bar at predetermined locations to form individual notched muntin bars;

e) wherein said first stage of the roll forming machine creates a raised center portion to the ribbon stock bounded by symmetrically spaced depressions bounded along two outer edges of the ribbon stock by edge portions generally co-planar with the raised center portion and wherein subsequent roll stages bend the ribbon stock upward around a centerline of the raised center portion to form the muntin bar tube having a seam extending along its length.

5. The apparatus of claim 4 further comprising a sensor for sensing the length of ribbon stock delivered to the notching device, and a process controller associated with the notching device, roll forming machine, and severing device, wherein the sensor provides signals to the controller indicating the sensed ribbon stock length, and the process controller provides control signals for enabling operations of said notching device and of said severing device.

6. The apparatus of claim 4, further comprising a conveyor for conveying the individual muntin bars away from the severing device.

7. Apparatus for making a contoured muntin bar comprising:

a) a supply of sheet material having a finished surface on at least one side in the form of a coiled ribbon;

b) a driver for uncoiling the ribbon from the supply and feeding the ribbon through a succession of forming stations positioned along a travel path;

c) a ribbon punch for punching the ribbon at a precisely predetermined location along the ribbon to form a notch in the ribbon, the notch being a selected one of a plurality of different notch patterns; said notch defining a portion of a contoured muntin bar;

d) a forming station comprising a succession of forming rolls having a succession of forming roll nips to bend the ribbon as said ribbon moves along the travel path and form an elongated, generally closed cross-sectional tube having raised planar sections on opposite sides of said tube;

e) a cutting station comprising a muntin bar severing apparatus for severing an endmost muntin bar from the cross-sectional tube at a precisely predetermined location by cutting the tube along a cut line that intersects a notch of the cross-sectional tube; and f) a clamp for clamping the tube prior to severing the endmost muntin bar from the cross-sectional tube and g) means for moving apart the endmost muntin bar from the cross-sectional tube to widen a gap between the endmost muntin bar and the cross-sectional tube resulting from the severing; and h) an abrasive tool for finishing ends of the endmost muntin bar and the cross-sectional tube facing the gap between the endmost muntin bar and the cross-sectional tube.

8. The apparatus of claim 7 further comprising an end station comprising a conveyor that delivers the muntin bars from the cutting station for subsequent assembly into a muntin bar grid.

9. The apparatus of claim 7 wherein the abrasive tool is a router bit that is rotated as it is inserted into the widened gap so that surfaces of the router bit perform the finishing step.

10. The apparatus of claim 9 wherein the cutting station comprises a saw blade for cutting the endmost muntin bar from the tube.

11. The apparatus of claim 10 wherein the saw blade and router bit are mounted to a common support for movement into and out of a tube path of travel at the cutting station.

12. The apparatus of claim 11 comprising a linear actuator for moving the common support and wherein the process controller supplies control signals to the common support to coordinate severing and finishing of mitred ends of muntin bars at the cutting station.

13. Apparatus for making a contoured muntin bar comprising:

a) a supply of sheet material having a finished surface on at least one side in the form of a coiled ribbon;

b) a driver for uncoiling the ribbon from the supply and feeding the ribbon through a succession of forming stations positioned along a travel path;

c) a ribbon punch for punching the ribbon at a precisely predetermined location along the ribbon to form a notch in the ribbon, the notch being selected from one of three different notch patterns; a first notch pattern defining a mitred end of a contoured muntin bar, a second notch pattern defining a flat end of a contoured muntin bar and a third notch pattern defining a slot along a side of the contoured muntin bar;

d) a forming station comprising a succession of forming rolls having a succession of forming roll nips to bend the ribbon as said ribbon moves along the travel path and form an elongated, generally closed cross-sectional tube having raised planar sections on opposite sides of said tube; and e) a cutting station comprising a muntin bar severing apparatus for severing an endmost muntin bar from the cross-sectional tube at a precisely predetermined location by cutting the tube along a cut line that intersects a notch that defines either a flat end or a mitred end of the contoured muntin bar.

* * * * *